(12) United States Patent
Markow

(10) Patent No.: US 11,175,051 B2
(45) Date of Patent: Nov. 16, 2021

(54) HEATING SYSTEM, KIT AND METHOD OF USING

(71) Applicant: Richard C. Markow, Gainesville, FL (US)

(72) Inventor: Richard C. Markow, Gainesville, FL (US)

(*) Notice: Subject to any disclaimer, the term of this patent is extended or adjusted under 35 U.S.C. 154(b) by 404 days.

(21) Appl. No.: 15/986,544

(22) Filed: May 22, 2018

(65) Prior Publication Data

US 2018/0266704 A1  Sep. 20, 2018

Related U.S. Application Data

(63) Continuation-in-part of application No. 14/563,666, filed on Dec. 8, 2014, now Pat. No. 9,976,774.

(60) Provisional application No. 61/912,756, filed on Dec. 6, 2013.

(51) Int. Cl.
| | |
|---|---|
| F24D 19/10 | (2006.01) |
| F24D 3/02 | (2006.01) |
| F24H 3/04 | (2006.01) |
| F24D 19/00 | (2006.01) |
| F24D 9/00 | (2006.01) |
| F24H 9/20 | (2006.01) |
| F24D 13/04 | (2006.01) |

(52) U.S. Cl.
CPC .......... *F24D 19/1048* (2013.01); *F24D 3/02* (2013.01); *F24D 9/00* (2013.01); *F24D 13/04* (2013.01); *F24D 19/0002* (2013.01); *F24D 19/0087* (2013.01); *F24D 19/1015* (2013.01); *F24H 3/0411* (2013.01); *F24H 9/2071* (2013.01); *Y02B 30/00* (2013.01)

(58) Field of Classification Search
None
See application file for complete search history.

(56) References Cited

U.S. PATENT DOCUMENTS 2,722,594 A * 11/1955 Kueser ................. H05B 1/0213
                                                         392/368
2,774,574 A * 12/1956 Patterson ................ F28D 1/024
                                                         165/55

(Continued)

*Primary Examiner* — Thor S Campbell
(74) *Attorney, Agent, or Firm* — Maxwell L. Minch; Maxwell L Minch Esq. PA

(57) ABSTRACT

A system and method for improving the responsiveness of forced hot water heat exchangers placed around the baseboards of conditioned living spaces and improving the efficiently of centralized hot water heating systems. The control system may comprise a convector baseboard heat exchanger or a replacement heat exchanger cover, and a blower, a diffuser and sensors which are mounted to one or more of the baseboard heat exchangers, the heating system influent and effluent loops, the fuel supply and the recirculation pump. When the heating system and forced hot water loop reaches its operating temperature, the blower activates to rapidly transfer energy from the-forced hot water loop into the air and disperse treated, heated air into the conditioned spaces. After the centralized heating system turns off, the system continues to transfer energy from the forced hot water into the air of the conditioned spaces until the latent heat of the centralized heating system has been extracted and the return loop temperatures are at levels consistent with optimal boiler performance.

13 Claims, 2 Drawing Sheets

(56) References Cited

U.S. PATENT DOCUMENTS

| | | | | |
|---|---|---|---|---|
| 2,820,880 A * | 1/1958 | Huntsinger | F24H 3/0411 | 392/363 |
| 2,903,245 A * | 9/1959 | Kritzer | F28D 1/024 | 165/55 |
| 2,903,246 A * | 9/1959 | Kritzer | F28D 1/024 | 165/55 |
| 2,927,780 A * | 3/1960 | Seeley | F28D 1/024 | 165/48.1 |
| 3,151,671 A * | 10/1964 | Kritzer | F28D 1/024 | 165/122 |
| 3,176,117 A * | 3/1965 | Knoll | F24H 3/0411 | 392/360 |
| 3,236,226 A * | 2/1966 | Eubanks | F24C 13/00 | 126/101 |
| 3,564,201 A * | 2/1971 | Jones | A61H 33/06 | 392/372 |
| 3,768,549 A * | 10/1973 | Goodie | F24H 3/0411 | 165/55 |
| 4,034,738 A * | 7/1977 | Barber, Jr. | F24D 11/003 | 126/586 |
| 4,046,320 A * | 9/1977 | Johnson | F24B 1/183 | 237/8 C |
| 4,126,268 A * | 11/1978 | Vitale | F24H 9/0073 | 236/38 |
| 4,335,703 A * | 6/1982 | Klank | F24B 1/183 | 126/514 |
| 4,518,847 A * | 5/1985 | Horst, Sr. | F24H 9/2071 | 126/101 |
| 4,815,526 A * | 3/1989 | Liljegren | F24D 7/00 | 165/48.1 |
| 4,888,469 A * | 12/1989 | Hennuy | F24H 3/0417 | 392/360 |
| 4,965,432 A * | 10/1990 | Harris | B60H 1/0025 | 219/203 |
| 5,014,770 A * | 5/1991 | Palmer | F24F 5/0046 | 165/48.2 |
| 5,261,251 A * | 11/1993 | Galiyano | F24F 5/0046 | 62/176.6 |
| 5,278,936 A * | 1/1994 | Shao | F24H 3/0417 | 219/492 |
| 5,553,701 A * | 9/1996 | Jarecki | B44D 3/126 | 15/257.06 |
| 5,730,644 A * | 3/1998 | Pfanstiehl | A46B 11/001 | 15/169 |
| 5,790,748 A * | 8/1998 | Tamhane | F24H 3/0411 | 165/57 |
| 6,223,543 B1 * | 5/2001 | Sandelman | F24F 11/0008 | 62/93 |
| 6,575,233 B1 * | 6/2003 | Krumnow | G05D 27/02 | 165/208 |
| 6,808,018 B1 * | 10/2004 | Toner | F24D 19/0087 | 165/299 |
| 6,973,260 B2 * | 12/2005 | Orr | F24H 3/0417 | 392/360 |
| 6,987,250 B2 * | 1/2006 | Levy | F24F 6/00 | 219/507 |
| 7,109,444 B2 * | 9/2006 | Levy | F24F 6/00 | 219/483 |
| 7,338,227 B2 * | 3/2008 | Bullivant | A46B 11/0013 | 401/208 |
| 7,532,810 B2 * | 5/2009 | Jayaram | F24H 3/0417 | 34/266 |
| 7,591,145 B1 * | 9/2009 | Wiggs | F24F 3/153 | 62/324.4 |
| 7,789,129 B1 * | 9/2010 | Barden | F24D 19/0087 | 165/244 |
| 7,841,389 B1 * | 11/2010 | Barba | F24D 19/0087 | 165/122 |
| 8,467,668 B2 * | 6/2013 | Searle | F24H 3/0417 | 392/371 |
| 10,072,856 B1 * | 9/2018 | Akin | F24D 12/02 | |
| 2001/0025349 A1 * | 9/2001 | Sharood | G06Q 30/0241 | 713/340 |
| 2001/0048030 A1 * | 12/2001 | Sharood | H05B 47/14 | 236/49.3 |
| 2003/0159803 A1 * | 8/2003 | Hansen | F24F 1/008 | 165/59 |
| 2003/0213248 A1 * | 11/2003 | Osborne | F28D 9/00 | 60/670 |
| 2003/0230633 A1 * | 12/2003 | Rixen | F23N 3/08 | 237/69 |
| 2003/0234296 A1 * | 12/2003 | Rixen | F23N 3/08 | 237/69 |
| 2005/0161521 A1 * | 7/2005 | Guyer | F24D 12/02 | 237/12.1 |
| 2006/0105112 A1 * | 5/2006 | Janssen | B44B 2/002 | 427/429 |
| 2007/0049176 A1 * | 3/2007 | Jones | B24B 23/028 | 451/28 |
| 2008/0277488 A1 * | 11/2008 | Cockerill | F24F 11/62 | 236/46 R |
| 2010/0230071 A1 * | 9/2010 | Slater | F24T 10/10 | 165/45 |
| 2011/0068575 A1 * | 3/2011 | Zabtcioglu | F24D 7/00 | 290/2 |
| 2011/0198406 A1 * | 8/2011 | Zhadanovsky | F24D 19/1003 | 237/12 |
| 2013/0259456 A1 * | 10/2013 | Viswanathan | F24C 1/08 | 392/407 |
| 2014/0048244 A1 * | 2/2014 | Wallace | G05D 7/0617 | 165/253 |
| 2014/0308432 A1 * | 10/2014 | VanGemert | B05D 5/005 | 427/8 |
| 2017/0082319 A1 * | 3/2017 | Manser | F24H 1/0018 | |
| 2017/0211821 A1 * | 7/2017 | Hardesty | F22D 5/34 | |
| 2018/0031251 A1 * | 2/2018 | Smith | F24D 19/1018 | |
| 2019/0236446 A1 * | 8/2019 | Qin | G06N 3/04 | |
| 2019/0353355 A1 * | 11/2019 | Garrabrant | F25B 25/02 | |
| 2020/0271329 A1 * | 8/2020 | Aumen | F24D 19/1009 | |

\* cited by examiner

HEATING SYSTEM, KIT AND METHOD OF USING

CROSS-REFERENCE TO RELATED APPLICATIONS

This application is a continuation-in-part of U.S. application Ser. No. 14/563,666, having a filing date of Dec. 8, 2018, which claims the benefit of U.S. Provisional Application No. 62/912,756, having filing date of Dec. 6, 2013, the disclosure of which is hereby incorporated by reference in its entirety and all commonly owned.

FIELD OF INVENTION

The present invention relates to an improved heating system and method for monitoring the thermal envelope of a dwelling, increasing the responsiveness of forced hot water emitters placed along the perimeter of conditioned spaces or articles of said dwelling, improving the efficiently of centralized hot water heating system, and reducing the energy usage of said centralized heating system. More specifically, the present invention rapidly transfers the energy from a closed loop central heating system into the occupied conditioned spaces of a dwelling to reduce heat transfer into unoccupied spaces and fully transfer the energy of a closed loop hydronic heating system to ensure optimal boiler performance.

BACKGROUND

Hydronic central heating systems circulate hydronic fluid (i.e. hot water) through a network of pipes to move heat from where it is produced to conditioned spaces or articles within or around the heat source order to heat them up to temperatures above their ambient surroundings. Common examples include: heating a room or rooms within a dwelling by means of piping hot water to a radiator exposed to the ambient air of a condition space; melting snow by piping hot water under walkways, driveways or parking lots and using the ground as the heat sync; or, heating potable water or swimming pools by means of immersing an heat exchanger within [a swimming pool] a hot water tank. Necessary equipment for performing such heating functions includes a heat source or boiler; at least one closed loop of hydronic fluid thermally connecting the heat source to the heat sync, or emitter; a means of circulating the hydronic fluid through the boiler to the heat sync and back to the boiler; and, control systems for starting and stopping the processes as necessary to regulate heat.

For example, a typical dwelling may have a central boiler, housed in the basement or in a utility space, or a garage. The boiler has a firebox were a combustible fuel is burned in a controlled manner. Within the firebox there is heat exchanger in thermal contact with the heat that is produced when the fuel is burned. A hydronic fluid, normally water or water containing chemical additives such as anti-freeze, is circulated within the tubes or between the plates of said heat exchanger in order to absorb the energy produced from the combustion of the fuel source. The effluent of the heat exchanger is connected by pipes to the influent of an emitter that is located within the space or item to be heated. As the heated hydronic fluid travels through the emitter, the emitter absorbs the heat and transfers it into the space or article to be heated. Emitters include baseboard heat exchangers, wall panel radiators, radiant floors, and, tube or plate heat exchangers among other items known in the art.

In an ideal application the rate of production of energy within the boiler would equal the rate of absorption of energy within the hydronic fluid, which would in turn equal the rate of heat transfer by the emitters and the rate of heat loss of the structure to the ambient. In real applications, boilers produce energy at a much higher rate than the rate at which the hydronic fluid can absorb the energy.

Additionally, the rate of transfer of energy from the emitter to the ambient spaces of the dwelling (or article to be heated, including driveway or pool water) is a function of differential temperature between hydronic fluid within the emitter and the ambient temperature space surrounding the emitter, the amount of time the two are in contact with each other and the method of heat transfer. For example, the flame of atomized heating oil reaches temperature in excess of 2600° F. Water boils under normal atmospheric conditions at 212° F. In order to prevent the hydronic fluid from boiling, which could lead to the inadvertent release of steam into a dwelling and catastrophic injuries occupants, hydronic fluid is maintained below 195° F. As a result, the amount of time that the water can remain in contact with the flame before it starts to boil is limited. The solution to this potential problem is to circulate the hydronic fluid at higher speeds during times when the boiler is producing heat. The problem is that increases in the circulation speeds of the hydronic fluids, without corresponding increases in the rate of heat transfer with the emitter to the ambient spaces of the dwelling does not change the amount of heat that is transferred from the emitters to the dwelling. The result is that the energy absorbed by the hydronic loop is not fully dissipated during pass of fluid through the loop. This results increases to boiler influent temperatures and decreased heating system efficiency.

The second problem is that the thermal envelope of the home and the weather conditions outside the home dictate how quickly the conditioned spaces lose heat. During periods of cold weather and high wind, the windward side of the home will lose heat faster than then loop can transfer heat into the conditioned space. That is because traditional baseboard emitters transfer heat through a natural convection process which is relatively slow compared to the rate at which the dwelling loses heat to the outdoors. The loss of heat within a room or rooms will result in a low room temperature condition, causing the boiler to cycle back on before all of the energy has been transferred from the loop to the conditioned spaces, resulting in further decreases in system efficiency.

For example, when a heating system is initially cycled-on, at the start of the heating season, the hydronic fluid temperature in the piping entering the boiler (boiler influent) is approximately 70° F. Once the boiler is turned on, or fired up, the temperature of the hydronic fluid exiting the boiler (boiler effluent) will be at or approaching 195° F. This creates a temperature differential of 125° F. across the boiler. (195−70=125.) This is the "rated" or most efficient band at which the boiler can operate. Studies by the U.S. Department of Energy have shown that after the first cycle of the heating season, and generally for the remainder of the heating season, the temperature of the water coming back from the dwelling and into the boiler is often as high as 145° F. due to inefficient heat transfer from the hydronic loop into the dwelling. The decreased differential temperature across the boiler of less than half of rated differential (195−145=50) can result in centralized hot water heating systems operating at less than half their rated efficiency.

Additionally, flue gas temperatures are inversely related to the differential temperature across the boiler. A decrease in the differential temperature across the boiler will increase exhaust flue gas temperatures. Increased exhaust flue gas temperatures will result in additional decreases in system efficiency as super-heated combustion gases are siphoned out of the boiler through the exhaust flue allowing them less time for combustion gases to transfer energy to the hydronic fluid.

Another factor impacting heating system efficiency, is the fact that homes and heating systems are designed as homogenous entities without regard to actual losses or instantaneous need. In North America, during the winter—expect during storms fueled by areas of strong pressure along the East Coast of the United States commonly referred to as No'easters—cold fronts comes down from Northern Canada across the Rockies in a south by south easterly direction. As a result, the side of a dwelling facing north, northwest is the most exposed and as a result, loses heat the fastest. Similarly, because every room of a dwelling is not generally occupied at the same time and not every occupant within a room desires the same amount of heat, the spaces of a dwellings have differing instantaneous heat demands. The changes in demand from instant to instant, mean that some rooms require more heat than others.

For example, at nighttime, when occupants are asleep, they may desire more heat in the [occupied] bedrooms than other [unoccupied] parts of the home. During meal times, occupants of the kitchen or dining space may desire more heat be directed to those spaces than other [unoccupied] bedrooms. At other times an office, den or living room may be occupied and it be desirous for that room to be heated to a greater degree than all others, especially vacant spaces within the same heating loop, or zone. Reducing heat output in unoccupied spaces allows for more heat to be transferred into occupied spaces for the same amount of system heat generation.

At other times, two occupants within the same space, may each desire that the part they occupy be heated to differing levels. One way to create personal zones of heating within the same space, is to increase the heat transfer rate on the emitters nearest one occupant while decreasing the heat transfer rate on emitters nearest another occupant.

Lastly, there does not currently exist a means to measure the efficiency of a centralize heating system and to dynamically change the heating profile of said system in order to maximize efficiency nor is there a method of monitoring the thermal envelope of a dwelling.

Hence, the inherent deficiencies of the present inventions have left open the possibility of still further improvement in the area of control of centralized hydronic heating systems and for monitoring the thermal envelope of a dwelling. Accordingly, it is an object of this invention to provide an article of control for hydronic heating systems and for thermal envelope monitoring which overcomes many of the above described problems.

BRIEF SUMMARY OF THE INVENTION

The present invention improves the efficiency of central hydronic heating systems by monitoring the fuel consumed by a boiler, the heat transferred in to the hydronic loop or loops, the heat transferred into the heated spaces or articles as well as the heat lost through the thermal envelope of the structure and adjusts the rate of heat transfer of each advector and the boiler operations to optimize system efficiency.

DESCRIPTION OF THE DRAWINGS

For a better understanding of the present embodiments, together with other and further aspects thereof, reference is made to the accompanying drawings and detailed description.

DETAILED DESCRIPTION OF THE INVENTION

Figure 1:
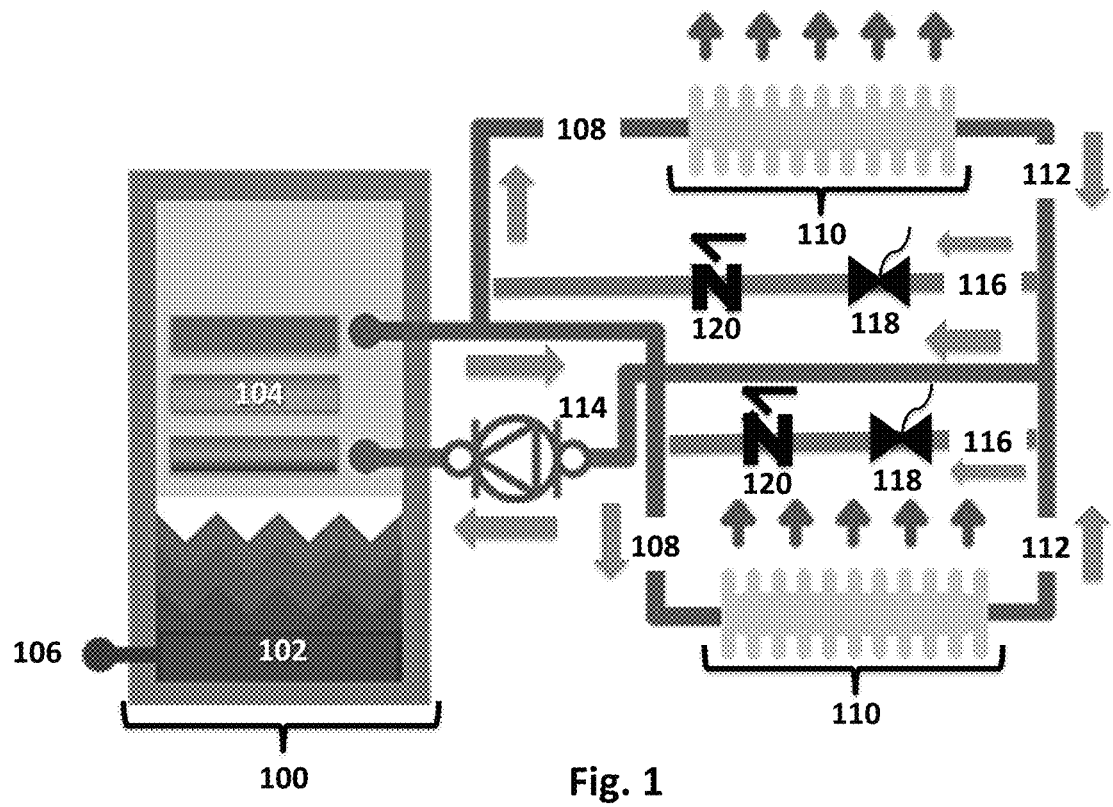
FIG. 1 is a pictorial of one embodiment of a centralized hydronic heating system with two heating zones, illustrating the: 100 boiler; 102 fire box; 104 heat exchanger; 106 fuel source; 108 emitter influent piping; 110 emitter; 112 emitter effluent piping; 114 combined system return piping; 116 loop cross-connect piping; 118 loop cross-connect valve; 120 loop cross-connect check valve.
Figure 2:
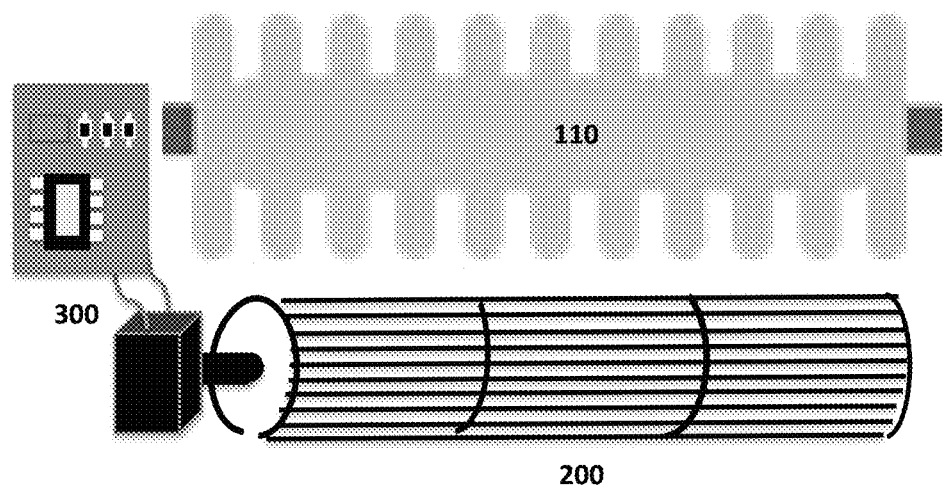
FIG. 2 is a pictorial of one embodiment of the 100 emitter; 200 advector; 300 advector controller.
Figure 3:
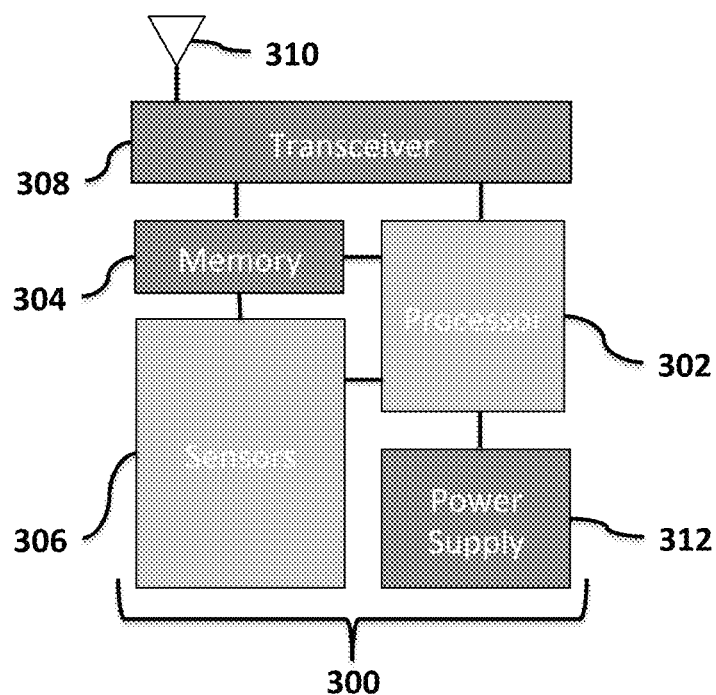
FIG. 3 a schematic pictorial of one embodiment of the 300 advector controller illustrating the 302 microprocessor; the 304 memory; 306 sensors; 308 transceiver; and, 310 antenna.
Figure 4:
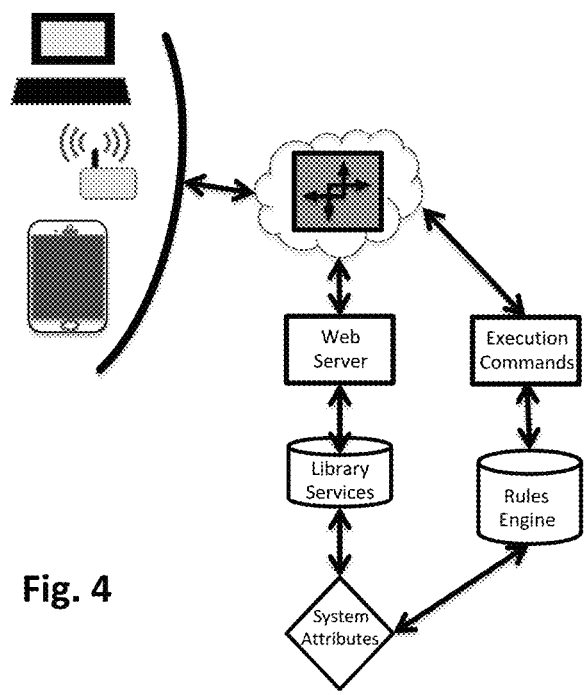
FIG. 4 is a schematic pictorial of one embodiment of the heating system efficiency monitoring and optimization control system.

A user can set the parameters by which the heating system efficiency monitoring and optimization control system will optimize heating system performance. This is accomplished by controlling the rate of heat transfer at the emiter. The system can be set to function automatically or it can be controlled manually at the emitter or through a website or internet connected device.

To minimize fuel consumption, the user would establish a set of rules that would limit boiler operations to the minimum necessary heat occupied spaces to a temperature the users establishes as comfortable. The system will determine when a space is occupied by user established parameters such as time of day, day of the week and room. The user can also designate one or more internet connected devices as indicators of occupancy. When temperature falls below a determinable temperature in an occupied space, the system will send a signal to the 100 boiler controller to turn on the boiler. When the water temperature at the 108 influent to the emitter or emitters within the occupied space reach a certain temperature and ise increasing, the system will send a signal to the 300 advector controller to turn on the 200 advector at a speed which will insure that as much of the heat being produced by the 100 boiler is being transferred into the room to heat the room up to the most efficient temperature for that space and structure within the given ambient conditions.

Because heating oil and other home heating fuels burn as such high temperatures relative to the temperature of the hydronic fluid, heating systems can only cycle on for short periods of time before they risk over heating the hydronic fluid and creating the conditions where a house could be flooded with steam. Once hydronic loop temperature has reached 195° F. the boiler must be cycled off. The boiler must remain off until the loop temperature decreases to such a level that is it safe to turn the boiler on again.

The other parameter that controls the boiler operations in a traditional heating system is room temperature. In a traditional system, the room thermometer sends a signal to turn a boiler at a certain low temperature set point and turn it off at a certain high temperature setpoint. When a structure has a poor thermal envelope or during periods of cold weather or high winds, the rate of heat loss to the ambient will be greater than the rate of heat transfer into the space from the heating system. In these situations, the thermometer will send a constant on signal to the boiler. As a result the boiler will repeatedly cycle on before all of the heat in the hydronic loop has been transferred into the conditioned spaces of the dwelling.

The present invention solves this problem by increasing the rate of heat transfer of natural convection emitters by converting them to advectors. The advectors of the present invention can increase the heat transfer of each emitter by 500. The ability to increase the rate of heat transfer coupled with the ability to control which emitter's transfer rate is increased allows the system to heat only the rooms that are occupied and fully transfer all of the heat being produced by the boiler. Transferring more heat into the room, reduces the emitter effluent water temperature, ensuring that the differential temperature across the boiler is maintained within levels consistent with optimal performance. Lastly, transferring more heat into a room increases the time between cycles and increases the amount of time that the boiler runs during each cycle. Reducing cycle times minimizes the amount of unburned fuel that is created at system start-up and shut down.

Controlling these three factors result in dramatic reduction in fuel consumption. Similarly by monitoring the rate of heat loss, the system can limit room temperature to the optimal temperature for the system given the dwelling's heat loss within a given set of ambient parameters. Monitoring fuel consumption, loop temperatures, heat transfer and ambient losses allows the system to determine the systems efficiency and thermal envelop at each emitter.

The invention claimed is:

1. A heating efficiency control system for monitoring the thermal envelope of a structure and monitoring and controlling the heat transfer of hydronic emitters and centralized forced hot water heating systems, the heating efficiency control system comprising of:
   a closed hydronic loop;
   a sensor
   hydronic emitter;
   an advector;
   an advector controller;
   a boiler efficiency monitor; and,
   a system controller;
   wherein the advector controller receives input from a sensor to signal to the advector controller to activate the advector when the water temperature at the influent of the emitter reaches a determinable temperature and deactivates the advector when the water temperature at the emitter effluent reaches a determinable temperature, the influent determinable temperature and the effluent determinable temperature capable of being determined via a wireless network, a home automation network, a wireline system, an Ethernet or combinations thereof.

2. The heating efficiency control system of claim 1, wherein the closed loop system comprises a central heating system comprising of:
   a heat source;
   a hydronic fluid; and,
   a hydronic fluid distribution system.

3. The heating control system of claim 1, wherein the hydronic emitter comprises a heat exchanger including:
   emitter influent piping;
   a heat exchanger;
   a housing; and,
   emitter effluent piping.

4. The heating control system of claim 1, wherein the hydronic emitter is a tube and fin heat exchanger, a panel heat exchanger, a radiator or combinations thereof.

5. The heating control system of claim 1, wherein the advector is a blower, said blower configured to draw air from the ambient surroundings of said emitter.

6. The heating control system of claim 1, wherein the advector is squirrel cage fan, centrifugal fan, axial fan, cross flow fan, propeller, bellows or combinations thereof.

7. The heating control system of claim 1, wherein the advector controller is microcircuit in communication with a sensor and an advector.

8. The heating control system of claim 1, wherein the advector controller is method of regulating the parameter at which the advector turns on, the parameter at which the advector turns off and/or the speed of the advector, in order to regulate temperature in a space or article, a central hydronic heating system, the efficiency of the thermal envelope of a structure, and/or the rate of heat transfer in an emitter or hydronic loop.

9. The heating control system of claim 1, wherein the sensor senses temperature, wind direction, wind speed, pressure, or humidity.

10. The heating control system of claim 1, wherein a recirculation loop allows hydronic fluid to flow between the effluent of the boiler and an emitter, the recirculation loop consisting of piping, a normally closed solenoid valve, and a check valve.

11. The heating control system of claim 1, wherein a boiler efficiency monitor observes the fuel consumption, influent loop temperature, effluent loop temperature, and loop flow rates, the boiler efficiency monitor consisting of a temperature sensor, a fuel sensor, a level sensor, and/or a flow rate sensor.

12. The heating control system of claim 1, further comprising a heating system efficiency monitoring and optimization control system for monitoring and controlling the heat source, the hydronic fluid distribution system, and/or an advector to adjust heating system and thermal envelop performance.

13. A heating efficiency control system for monitoring the thermal envelope of a structure and monitoring and controlling the heat transfer of hydronic emitters and centralized forced hot water heating systems, the heating efficiency control system comprising of:
   a closed loop system;
   a sensor
   a hydronic emitter;
   an advector;
   an advector controller;
   a loop recirculation valve;
   a loop check valve; and
   a boiler efficiency monitor;
   wherein the advector controller activates the advector when the loop influent temperature to the emitter reaches a predetermined temperature and deactivates the advector when the loop effluent temperature reaches a predetermined temperature; the influent predetermined temperature and the effluent predetermined temperature capable of being set by the advector controller,
   wherein the loop recirculation valve opens when the water within the closed loop is greater than the determinable temperature which activates the advector and the boiler is not in operation, allowing water to flow though said recirculation loop and closes the loop recirculation valve when the boiler is in operation.

* * * * *